United States Patent Office 2,980,694
Patented Apr. 18, 1961

2,980,694
PROCESS FOR THE PREPARATION OF MALEIMIDES

Carol K. Sauers, Middlebush, and Robert J. Cotter, New Brunswick, N.J., assignors to Union Carbide Corporation, a corporation of New York No Drawing. Filed Nov. 5, 1959, Ser. No. 851,030
8 Claims. (Cl. 260—326.5)

This invention relates to the preparation of maleimides. More particularly, this invention relates to the preparation of N-substituted maleimides by the isomerization of the corresponding isomaleimides.

The preparation of maleimides has been accomplished, generally, by the pyrolytic dehydration of maleamic acids at relatively high temperatures. Pyrolytic dehydration of maleamic acids at relatively high temperatures to produce the corresponding maleimides has resulted in the preparation of a product which is low in maleimide content and high in undesirable by-product content. Maleimides possess a reactive, double bond and are readily susceptible to polymerization producing undesirable by-products under the conditions required for pyrolytic dehydration.

The present invention provides for the preparation of N-substituted maleimides in satisfactory yields by contacting an N-substituted isomaleimide with an anion of a lower fatty acid, i.e., a saturated fatty acid having a maximum of four carbon atoms, whereby the N-substituted isomaleimide is isomerized to the corresponding maleimide.

The reaction which results in the preparation of N-substituted maleimides in accordance with the present invention can be illustrated by the following equations wherein the N-substituted isomaleimides, N,N'-1,4-phenylene bis-isomaleimide and N-phenyl isomaleimide are isomerized in the presence of an acetate anion.

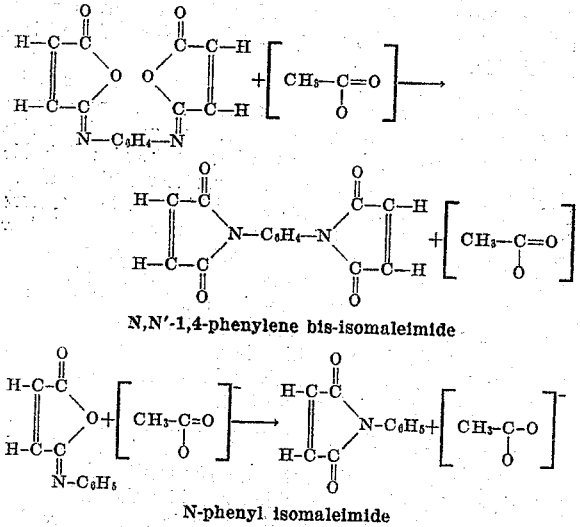

N,N'-1,4-phenylene bis-isomaleimide

N-phenyl isomaleimide

Illustrative of N-substituted isomaleimides which can be isomerized to the corresponding maleimides in accordance with the present invention are those having the general formula:

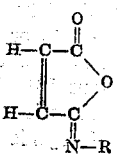

in which R is a monovalent hydrocarbon radical, or a divalent hydrocarbon radical having as a substituent on its terminal carbon atom a radical having the formula:

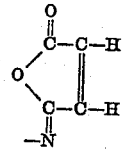

These latter N-substituted isomaleimides are commonly referred to as bis-isomaleimides.

The term "monovalent hydrocarbon radical" as used herein refers to unsubstituted hydrocarbon radicals as well as to substituted hydrocarbon radicals.

Exemplary of such radicals are the following: alkyl radicals, such as methyl, ethyl, n-propyl, n-butyl, n-hexyl, 2-ethyl-n-hexyl, n-octyl, n-dodecyl, and the like; cycloalkyl radicals, such as cyclohexyl and the like; unsaturated alkyl and cycloalkyl radicals, such as allyl, cyclopentenyl, and the like; halogenated alkyl and cycloalkyl radicals, such as chloroethyl, bromoethyl, fluoroethyl, 2-chloro-n-propyl, 2-bromo-n-propyl, 2-chloro-n-butyl, 3-chloro-n-amyl, 3-bromo-n-amyl, 2-chloro-n-hexyl, 2-chlorocyclohexyl, and the like; alkoxy and aryloxy substituted alkyl and cycloalkyl radicals, such as methoxymethyl, ethoxyethyl, 3-ethoxy-n-propyl, 4-ethoxy-n-butyl, 3-ethoxy-2-ethyl-n-hexyl, 2-methoxycyclohexyl, phenoxymethyl, 2-phenoxyethyl, 3-phenoxy-n-propyl, 2-phenoxy cyclohexyl, and the like; aralkyl radicals, such as benzyl, 2-phenyl ethyl, 3-phenyl-n-propyl, 1-phenyl-n-butyl, 1-phenyl-n-docesyl, and the like; aryl radicals, such as phenyl, naphthyl, and the like; halogenated aryl radicals, such as p-chlorophenyl, p-bromophenyl, p-fluorophenyl, p-iodophenyl, 2-chloronaphthyl, 2-bromonaphthyl, and the like; alkoxy and aryloxy substituted aryl radicals, such as p-methoxyphenyl, p-ethoxyphenyl, p-n-propoxyphenyl, and the like; alkaryl radicals, such as o-methylphenyl, p-ethylphenyl, p-n-propylphenyl, o-n-propylphenyl, o-n-butylphenyl, p-n-dodecylphenyl, p-(2-ethyl-n-hexyl) phenyl, and the like; nitro substituted aryl radicals, such as p-nitrophenyl, 2-nitronaphthyl, and the like; other suitable radicals include 4-hydroxy-1-naphthyl, and the like.

Representative of isomaleimides wherein R in the general formula previously given is a monovalent hydrocarbon radical are the following: N-methyl isomaleimide, N-ethyl isomaleimide, N-n-propyl isomaleimide, N-allyl isomaleimide, n-butyl isomaleimide, N-tertiary butyl isomaleimide, N-n-hexyl isomaleimide, N-(2-ethyl-n-hexyl) isomaleimide, N-n-heptyl isomaleimide, N-n-nonyl isomaleimide, N-n-dodecyl isomaleimide, N-n-docosyl isomaleimide, N-cyclohexyl isomaleimide, N-(2-chloroethyl) isomaleimide, N-(2-bromoethyl) isomaleimide, N-(2-fluoroethyl) isomaleimide, N-(2-iodo-n-propyl) isomaleimide, N-(2-chloro-n-hexyl) isomaleimide, N-methoxy methyl isomaleimide, N-benzyl isomaleimide, N-(2-phenylethyl) isomaleimide, N-(3-phenyl-n-propyl) isomaleimide, N-(4-phenyl-n-butyl) isomaleimide, N-phenyl isomaleimide, N-naphthyl isomaleimide, N-(o-chlorophenyl) isomaleimide, N-(m-bromophenyl) isomaleimide, N-(p-fluorophenyl) isomaleimide, N-(o-iodophenyl) isomaleimide, N-(o-methoxyphenyl) isomaleimide, N-(m-methoxyphenyl) isomaleimide, N-(p-ethoxyphenyl) isomaleimide, N-(p-n-butoxyphenyl) isomaleimide, N-(p-chloro-m-methylphenyl) isomaleimide, N-(o-methylphenyl) isomaleimide, N-(m-methylphenyl) isomaleimide, N-(o-ethylphenyl) isomaleimide, N-(m-ethylphenyl) isomaleimide, N-(p-ethylphenyl) isomaleimide, N-(o-isopropylphenyl) isomaleimide, N-(m-isopropylphenyl) isomaleimide, N-(p-isopropylphenyl) isomaleimide, N-(o-n-butylphenyl) isomaleimide, N-(m-n-butylphenyl) isomaleimide, N-(4- hydroxy-2-naphthyl) isomaleimide, N-(4-hydroxy-1-naphthyl) isomaleimide, and the like.

The term "divalent hydrocarbon radical" as used herein is intended to encompass both unsubstituted as well as substituted divalent hydrocarbon radicals. Illustrative of suitable radicals are alkylene radicals, such as ethylene, trimethylene, tetramethylene, pentamethylene, hexamethylene, 2-ethyl hexamethylene, octamethylene, nonamethylene, decamethylene, and the like; the cycloaliphatic radicals such as 1,4-cyclohexane, 1,3-cyclohexane, 1,2-cyclohexane, and the like; halogenated alkylene and cycloaliphatic radicals, such as 2-chloroethylene, 2-bromoethylene, 2-fluoroethylene, 2-iodoethylene, 2-chlorotrimethylene, 2-bromotrimethylene, 2-chloropentamethylene, 3-chlorohexamethylene, 2-chlorooctamethylene, and the like; alkoxy and aryloxy substituted alkylene and cycloaliphatic radicals, such as methoxy methylene, ethoxy methylene, ethoxy ethylene, 2-ethoxy trimethylene, 3-ethoxy pentamethylene, 1,4-(2-methoxy cyclohexane), phenoxy ethylene, 2-phenoxy trimethylene, 1,3-(2-phenoxy cyclohexane), and the like; aralkylene radicals, such as phenyl ethylene, 2-phenyl trimethylene, 1-phenyl pentamethylene, 2-phenyl decamethylene, and the like; aromatic radicals, such as phenylene, naphthylene, and the like; halogenated aromatic radicals, such as 1,4-(2-chlorophenylene), 1,4-(2-bromophenylene), 1,4-(2-fluorophenylene), and the like; alkoxy and aryloxy substituted aromatic radicals, such as 1,4-(2-methoxyphenylene), 1,4-(2-ethoxyphenylene), 1,4-(2-n-propoxyphenylene), 1,4-(2-phenoxyphenylene), and the like; alkyl substituted aromatic radicals, such as 1,4-(2-methylphenylene), 1,4-(2-ethylphenylene), 1,4-(2-n-propylphenylene), 1,4-(2-n-butylphenylene), 1,4-(2-n-dodecylphenylene), and the like.

Among N-substituted isomaleimides wherein R in the formula previously noted is a divalent hydrocarbon radical having as a substitutent on its terminal carbon atom a radical having the formula:

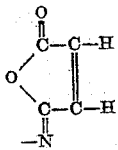

can be noted

N,N'-ethylene bis-isomaleimide,
N,N'-trimethylene bis-isomaleimide,
N,N'-tetramethylene bis-isomaleimide,
N,N'-decamethylene bis-isomaleimide,
N,N'-(1,4-cyclohexane) bis-isomaleimide,
N,N'-(2-chlorotrimethylene) bis-isomaleimide,
N,N'-(2-bromotrimethylene) bis-isomaleimide,
N,N'-(2-chlorotetramethylene) bis-isomaleimide,
N,N'-(3-chlorohexamethylene) bis-isomaleimide,
N,N'-(2-ethoxytetramethylene) bis-isomaleimide,
N,N'-(1-ethoxytetramethylene) bis-isomaleimide,
N,N'-[1,4-(2-methoxycyclohexane)] bis-isomaleimide,
N,N'-(2-phenoxyethylene) bis-isomaleimide,
N,N'-(2-phenoxytrimethylene) bis-isomaleimide,
N,N'-[1,4-(2-phenoxycyclohexane)] bis-isomaleimide,
N,N'-[1,4-(2-nitrocyclohexane)] bis-isomaleimide,
N,N'-phenylethylene bis-isomaleimide,
N,N'-(2-phenylethylene) bis-isomaleimide,
N,N'-(2-phenyltrimethylene) bis-isomaleimide,
N,N'-(2-phenyltetramethylene) bis-isomaleimide,
N,N'-(1-phenyldodecamethylene) bis-isomaleimide,
N,N'-(1,4-phenylene) bis-isomaleimide,
N,N'-(1,5-napthhalene) bis-isomaleimide,
N,N'-[1,4-(2-chlorophenylene)] bis-isomaleimide,
N,N'-[1,4-(2-bromophenylene)] bis-isomaleimide,
N,N'-[1,4-(2-methoxyphenylene)] bis-isomaleimide,
N,N'-[1,4-(2-ethoxyphenylene)] bis-isomaleimide,
N,N'-[1,4-(2-phenoxy)] bis-isomaleimide,
N,N'-[1,4-(2-methylphenylene)] bis-isomaleimide,
N,N'-[1,4-(2-ethylphenylene)] bis-isomaleimide,
N,N'-(4,4'-diphenyl methane) bis-isomaleimide,
N,N'-(4,4'-diphenylether) bis-isomaleimide,
N,N'-[1,4-(2-n-dodecylphenylene)] bis-isomaleimide,
N,N'-(4,4'-benzophenone) bis-isomaleimide, and the like.

Particularly desirable compounds for purposes of this invention are those wherein R is either a monovalent or divalent radical as previously described having a maximum of 20 carbon atoms and being free of interfering groups such as —COOH and NH$_2$.

N-substituted isomaleimides can be conveniently prepared by reacting an N-substituted maleamic acid with N,N'-dicyclohexyl carbodiimide, as is described in detail in our copending application Serial No. 851,029, filed concurrently herewith, which is incorporated by reference.

Any compound which will provide a lower fatty acid anion in a reaction mixture containing an N-substituted isomaleimide can be used in the process of the present invention. Particularly desirable are the salts of the lower fatty acids, such as the alkali metal salts, exemplary of which are sodium formate, potassium formate, lithium formate, sodium acetate, potassium acetate, lithium acetate, sodium propionate, potassium propionate, lithium propionate, sodium butyrate, potassium butyrate, lithium butyrate; the ammonium salts, such as trimethyl ammonium formate, triethyl ammonium acetate, trimethyl ammonium propionate, trimethyl ammonium butyrate, triethyl ammonium formate, triethyl ammonium acetate, triethyl ammonium propionate, tri-n-butyl ammonium butyrate, and the like.

Compounds which provide an anion of a lower fatty acid are used in amounts sufficient to provide a catalytic amount of the aforementioned anion, that is, an amount of anion sufficient to isomerize the N-substituted isomaleimide to the corresponding maleimide. The actual quantity of such compounds can vary between wide limits, from about 0.05 mole to about 6 moles per mole of N-substituted isomaleimide charged. Using an amount in excess of about 6 moles per mole of N-substituted isomaleimide does not materially increase the yield of N-substituted maleimide obtained and is economically unsound. For optimum results, it is preferred to use from about 0.25 to about 2 moles per mole of the N-substituted isomaleimide.

The temperature at which the present process can be conducted can be varied over a wide range, from about 20° C. to a temperature below the decomposition point of the starting materials and the N-substituted maleimide formed. Generally, at temperatures lower than about 20° C. the reaction proceeds sluggishly. A temperature in the range of from about 60° C. to a temperature below the decomposition point of the starting materials and the N-substituted maleimide formed is most preferred.

It is also preferred to isomerize the N-substituted isomaleimides to the corresponding maleimides in admixture with an organic diluent which is a solvent for the starting materials and is non-reactive with respect to the starting materials and the final product.

The use of an organic diluent facilitates removal of the final product from the starting materials. Also, in those instances wherein both the N-substituted isomaleimide and the compound which provides the anion of a lower fatty acid are solids, the organic diluent provides a medium in which the anion can readily come into contact with the N-substituted isomaleimide.

The actual organic diluent used will depend upon the starting materials and the temperature at which the reaction is to be conducted. The organic diluent should have a boiling point equal to or above the reaction temperature. It is customary to use the organic diluent in amounts of at least about 50% by weight based on the weight of the starting materials. The upper limit with respect to the amount of organic diluent used will depend upon the rate at which it is desired to conduct the reaction. The more dilute the reaction mixture, the slower the rate of reaction. From a practical standpoint, the organic diluent is used in amounts up to about 500% by weight based on the weight of the starting materials.

Suitable organic diluents include, among others, the aromatic hydrocarbons, such as benzene, xylene, and the like; the halogenated aromatic hydrocarbons, such as chlorobenzene and the like; cycloaliphatic hydrocarbons, such as cyclohexane, n-propyl cyclohexane, and the like; alkoxy substituted aromatic hydrocarbons, such as methoxy, benzene, and the like; aliphatic hydrocarbons, such as n-hexane, n-heptane, and the like; halogenated aliphatic hydrocarbons, such as dichloromethane, 1,2-dichloroethane, and the like; anhydrides of lower fatty acids, i.e., saturated acids having a maximum of four carbon atoms, such as acetic anhydride, propionic anhydride, and the like; ethers, such as diethyl ether, dioxane, diethyl ether of ethylene glycol, diethyl ether of 1,3-propylene glycol, and the like; aliphatic ketones, such as acetone, methyl ethyl ketone, and the like; also suitable is dimethyl formamide and the like.

It is desirable to conduct the isomerization reaction under atmospheric pressure, although if desired, the reaction can be conducted under subatmospheric or superatmospheric pressure.

The process of the present invention is conducted by simply admixing an N-substituted isomaleimide and a compound which will provide an anion of a lower fatty acid at the desired temperature. If desired, the anion-providing compound can be formed in situ in the reaction mixture, as for example by admixing a lower fatty acid, such as acetic acid and a tertiary amine, such as triethylamine. The acetic acid and triethylamine will react to produce the triethylammonium salt of acetic acid. To this mixture is then added the N-substituted isomaleimide. When preparing the anion-containing compound in a manner described in the preceding sentence, sufficient amounts of reactants are used to produce the anion-containing compound in the amounts previously noted. Isomerization of the N-substituted isomaleimide to the corresponding maleimide takes place almost instantaneously upon mixing of the necessary starting materials. It is customary, however, to allow the mixture to stand at the desired temperature for at least one hour in order to insure that substantially all of the N-substituted isomaleimide has been converted to the corresponding maleimide.

Recovery of the N-substituted maleimide from the reaction mixture can be accomplished by any one of a number of convenient methods. For example, in those instances wherein there is no diluent present in the reaction mixture or if a diluent is present it is miscible with water, the reaction mixture can be poured into water with the result that the N-substituted maleimide separates out of the resultant water mixture. If the N-substituted maleimide is a solid, it can then be recovered by a simple filtration operation and then, if desired, recrystallized from suitable organic liquids such as the organic liquids previously noted in this specification as organic diluents or from organic alcohols such as isopropanol. If the N-substituted maleimide is a liquid, it can then be removed from the resultant water mixture by an extraction using a suitable organic solvent and recovered by evaporation of the solvent.

In those instances wherein the organic diluent present in the reaction mixture is immiscible with water, the N-substituted maleimide formed is recovered by simply evaporating off the organic diluent.

If desired, the N-substituted maleimides can also be washed with aqueous solutions of sodium bicarbonate and the like.

The N-substituted maleimides are known compounds and can be used as insecticides and can be produced as described in the book "Maleic Anhydride Derivatives" by L. A. Flett and W. H. Gardner.

In the examples which follow, "authentic" N-substituted maleimides were prepared according to the procedure described on page 106 of the book noted above. These examples are intended to further illustrate the present invention and are not intended to limit the scope thereof in any manner.

EXAMPLE 1

*Isomerization of N-phenyl isomaleimide to N-phenyl maleimide*

Into a Pyrex glass flask containing 15 ml. of acetic anhydride and one gram of anhydrous sodium acetate there was charged 5 grams of N-phenyl isomaleimide. The reaction mixture was heated at 90° C. for one hour, cooled to about 25° C. (room temperature) and poured, with vigorous stirring, into a flask containing water which was at a temperature of about 20° C. The short yellow needle-like solid which precipitated out was recovered as a filter cake and dried for about 24 hours at 25° C. 4.5 grams of N-phenyl maleimide in the form of short yellow needles were recovered.

The melting point of N-phenyl maleimide was 90° C. to 91° C. The melting point of a mixture of N-phenyl maleimide prepared as described with an equal amount of authentic N-phenyl maleimide was undepressed.

EXAMPLE 2

*Isomerization of N,N'-(4,4'-diphenylmethane) bis-isomaleimide to N,N'-(4,4'-diphenylmethane) bis-maleimide*

Into a Pyrex glass flask containing 20 ml. of acetic anhydride and one gram of anhydrous sodium acetate there was charged 4 grams of N,N'-(4,4'-diphenylmethane) bis-isomaleimide. The mixture was heated at 90° C. for three hours, cooled to about 25° C. and then poured, with vigorous stirring, into a flask containing water which was at a temperature of about 20° C. The yellow solid which precipitated out was recovered as a filter cake and thereafter dried at 25° C. for 24 hours. 3.5 grams of N,N'-(4,4'-diphenylmethane) bis-maleimide were recovered in the form of a yellow colored solid and recrystallized from methyl ethyl ketone.

The melting point of N,N'-(4,4'-diphenylmethane) bis-maleimide was 155° C. to 157° C. The melting point of a mixture of the N,N'-(4,4'-diphenylmethane) bis-maleimide and an equal amount of authentic N,N'-(4,4'-diphenylmethane) bis-maleimide was undepressed.

EXAMPLE 3

*Isomerization of N,N'-hexamethylene bis-isomaleimide to N,N'-hexamethylene bis-maleimide*

Into a Pyrex glass flask containing 200 ml. of dry benzene, 1.8 grams (0.03 mole) of acetic acid and 2.6 grams (0.026 mole) of triethylamine, there was then charged 4 grams of N,N'-hexamethylene bis-isomaleimide. The mixture was heated at reflux for 16 hours, cooled to about 25° C. and then washed with 150 ml. of water in a separatory funnel. The organic layer was separated from the water layer and evaporated under reduced pressure to a solid residue. The solid residue was recrystallized from isopropanol yielding 1.4 grams of N,N'-hexamethylene bis-maleimide having a melting point of between 136° C. and 141° C. A melting point of a mixture of N,N'-hexamethylene bis-maleimide prepared as described above with an equal amount of authentic N,N'-hexamethylene bis-maleimide was undepressed.

EXAMPLE 4

*Isomerization of N-n-butyl isomaleimide to N-n-butyl maleimide*

Into a Pyrex glass flask containing 100 ml. of benzene, 6.06 grams (0.06 mole) of triethylamine and 3.6 grams (0.06 mole) of acetic acid, there was charged 5 grams of N-n-butyl isomaleimide. The mixture was cooled to about 23° C., washed with successive portions of 100 ml. of water and 100 ml. of a 10% aqueous solution of sodium hydroxide and 100 ml. of water in a separatory funnel.

The organic layer was recovered and evaporated under 30 mm. Hg evaporating off the benzene. The liquid remaining was distilled at a temperature of 50° C.–55° C. under a pressure of 0.5 mm. Hg, yielding as the distillate a clear liquid. The liquid was identified as N-n-butyl maleimide by vapor phase chromatographic analysis and by infra-red analysis.

What is claimed is:

1. Process for the preparation of an N-substituted maleimide which comprises contacting an N-substituted isomaleimide having the formula:

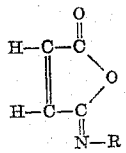

wherein R is selected from the group consisting of a monovalent hydrocarbon radical, and a divalent hydrocarbon radical having as a substituent on its terminal carbon atom a radical having the formula:

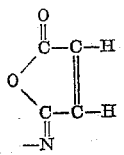

with a catalytic amount of an anion of a lower fatty acid for a period of time sufficient to isomerize the said isomaleimide to the corresponding maleimide.

2. Process as defined in claim 1 wherein the isomerization of the N-substituted isomaleimide to the corresponding maleimide is conducted at a temperature of about 20° C. to below the decomposition temperature of the starting materials and of the N-substituted maleimide which is formed.

3. Process as defined in claim 1 wherein the N-substituted isomaleimide is N-phenyl isomaleimide.

4. Process as defined in claim 1 wherein the N-substituted isomaleimide is N,N'-(4,4'-diphenylmethane) bis-isomaleimide.

5. Process as defined in claim 1 wherein the N-substituted isomaleimide is N-n-butyl isomaleimide.

6. Process as defined in claim 1 wherein the N-substituted isomaleimide is N,N'-hexamethylene bis-isomaleimide.

7. Process as defined in claim 1 wherein the lower fatty acid anion is the acetate anion.

8. Process for the preparation of an N-substituted maleimide which comprises admixing in an organic diluent an N-substituted isomaleimide having the formula

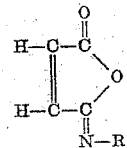

wherein R is selected from the group consisting of a monovalent hydrocarbon radical, and a divalent hydrocarbon radical having as a substituent on its terminal carbon atom a radical having the formula:

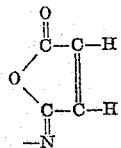

with an amount of a salt of a lower fatty acid sufficient to provide a catalytic amount of a fatty acid anion for a period of time sufficient to isomerize said isomaleimide to the corresponding maleimide, said salt of a lower fatty acid being present in amounts of from about 0.05 mole to about 6 moles per mole of N-substituted isomaleimide.

No references cited.